United States Patent
Sayer (10) Patent No.: US 8,904,892 B2
(45) Date of Patent: Dec. 9, 2014

(54) DOUBLE-TAPERED MOUNT FOR OSCILLATING SHAFT

(75) Inventor: Douglas A. Sayer, Pocatello, ID (US)

(73) Assignee: Premier Technology, Inc., Blackfoot, ID (US)

( * ) Notice: Subject to any disclaimer, the term of this patent is extended or adjusted under 35 U.S.C. 154(b) by 878 days.

(21) Appl. No.: 12/959,157

(22) Filed: Dec. 2, 2010

(65) Prior Publication Data

US 2012/0137804 A1 Jun. 7, 2012

(51) Int. Cl.
*F16H 21/44* (2006.01)
*B66D 1/54* (2006.01)
*B66D 1/36* (2006.01)
*F16D 1/096* (2006.01)

(52) U.S. Cl.
CPC .. *B66D 1/36* (2013.01); *B66D 1/54* (2013.01); *F16D 1/096* (2013.01)
USPC .................................. 74/96; 74/108; 464/180

(58) Field of Classification Search
USPC ............ 74/96, 97.1, 97.2, 108; 464/104, 160, 464/161, 180, 182
See application file for complete search history.

(56) References Cited

U.S. PATENT DOCUMENTS

| 2,598,709 A | * | 6/1952 | Morris | ......................... 74/89.14 |
| 5,029,461 A | * | 7/1991 | Lawrence et al. | ............... 72/238 |
| 2003/0020324 A1 | | 1/2003 | Radke et al. | |

FOREIGN PATENT DOCUMENTS

FR 1581941 A * 2/1970
WO WO2009/143276 A2 11/2009

OTHER PUBLICATIONS

International Search Report issued in PCT/US2011/062705 dated Mar. 8, 2012.

* cited by examiner

*Primary Examiner* — Pamela Rodriguez
(74) *Attorney, Agent, or Firm* — TraskBritt (57) ABSTRACT

A mount for a shaft includes a collar, disposable around the shaft, a first mating piece and a second mating piece. The collar includes first and second tapered outer surfaces that taper away from each other. The first mating piece has a first tapered aperture that is configured to mate with the first tapered outer surface of the collar. The second mating piece has a second tapered aperture configured to mate with the second tapered outer surface of the collar. The first and second mating pieces are adapted to be aligned such that when the collar is mated with the first and second mating pieces, the shaft is substantially perpendicular to the first mating piece.

5 Claims, 6 Drawing Sheets

DOUBLE-TAPERED MOUNT FOR OSCILLATING SHAFT

BACKGROUND OF THE INVENTION

1. Field of the Invention

The present disclosure generally relates to mounting devices for shafts. More particularly, the present disclosure relates to a double-tapered mount for an oscillating shaft.

2. Description of the Related Art

In the field of mechanics, there are a wide variety of methods for attaching the various components of a moving part. These include, bolts, rivets, welding and press-fits, for example. The type of connection used in a given instance can vary depending upon the materials involved, the size of the parts, the stresses the parts are expected to experience, the dimensional tolerances for the attachment, and other factors.

Oscillating shafts can present certain connection challenges. Shafts that move at a high oscillating speed or with high loads and/or high stresses can be difficult to connect to other parts. Difficulties with such connections can arise from the use of differing materials for different parts. Additionally, such connections can be complicated, making it difficult and/or time-consuming to remove or replace related parts, in addition to the cost.

The present disclosure is directed to overcoming, or at least reducing the effects, of one or more of the issues set forth above.

SUMMARY OF THE INVENTION

In accordance with an embodiment thereof, the present disclosure provides a mount for a shaft, including a collar, disposable around the shaft, a first mating piece and a second mating piece. The collar includes first and second tapered outer surfaces that taper away from each other. The first mating piece has a first tapered aperture that is configured to mate with the first tapered outer surface of the collar. The second mating piece has a second tapered aperture configured to mate with the second tapered outer surface of the collar. The first and second mating pieces are adapted to be aligned such that when the collar is mated with the first and second mating pieces, the shaft is substantially perpendicular to the first mating piece.

In one embodiment, the collar is configured to be in abutment with opposing steps of a region of reduced diameter of the shaft. In one embodiment, the tapered outer surfaces of the collar have a taper angle of about 3°. The first and second tapered outer surfaces of the collar can have different taper angles.

In one embodiment, the mount can include a spring, attached to the first mating piece.

In another embodiment, the mount can include a third mating piece, having a third tapered aperture, configured to mate with the first tapered outer surface of the collar on a side of the first mating piece opposite the second mating piece.

In one embodiment, the first mating piece comprises a drive member having first and second sides, and the second mating piece comprises a first cap, attachable toward the first side of the drive member. In another embodiment, the mount includes a second cap, having a third tapered aperture, attachable toward the second side of the drive member and configured to mate with the first tapered outer surface of the collar.

In another embodiment, the mount can include a pair of coil springs, coaxially disposable around the shaft, an end of each one of the pair of springs being in abutting contact with the first and second caps, respectively.

In one embodiment, the driving member comprises a drive plate of a cable impact reduction box.

In accordance with another embodiment thereof, the present disclosure provides an oscillating shaft mechanism, including a shaft, a split collar, a drive member, and a first cap. The shaft has a diameter and a central region of reduced diameter, and is configured for oscillating motion. The split collar is disposed about the central region of the shaft, and has first and second tapered outer surfaces that taper away from each other. The drive member has first and second sides and a tapered aperture configured to mate with the first tapered outer surface of the split collar. The first cap is attached toward the first side of the drive member, and has a tapered aperture configured to mate with the second tapered outer surface of the split collar, whereby the shaft is securely held within the tapered aperture of the driving member and substantially perpendicular thereto during the oscillating motion.

In accordance with a more detailed embodiment, the oscillating shaft mechanism can include a frame, having opposing sides substantially perpendicular to a direction of the oscillating motion of the shaft, and a pair of compression springs, disposed around the shaft on opposing sides of the driving member, and abutting an interior of the opposing sides of the frame.

In accordance with another more detailed embodiment, the oscillating shaft mechanism can include a second cap, attached toward the second side of the drive member, having a tapered aperture configured to mate with the first tapered outer surface of the split collar.

In accordance with another more detailed embodiment, the shaft includes a step at opposing ends of the central region, the split collar being configured to be in abutment with the opposing steps.

In accordance with yet another embodiment thereof, the present disclosure provides an energy damping mechanism, including a drive plate, a frame, and a pair of oscillating shaft mechanisms. The drive plate includes a pair of tapered apertures toward opposing ends thereof. The frame has opposing sides with two pair of axially aligned apertures therein, and a bushing in each aperture. The oscillating shaft mechanisms each include a shaft, a split collar, and a first cap. The shaft has a diameter and a central region of reduced diameter, and is slidingly disposed in an aligned pair of the bushings. The split collar is disposed about the central region of the shaft, and has a first outer taper conformable to one of the tapered apertures of the drive plate, and a second outer taper having an orientation opposite to the first outer taper. The first cap is attached to a first side of the drive plate, around the shaft, and in abutting contact with the second outer taper, the first cap having an inner taper conformable to the second outer taper, whereby the first and second outer tapers of the split collar securely hold the shaft within the tapered aperture of the drive plate and substantially perpendicular thereto.

In accordance with a more detailed embodiment, the damping mechanism includes a second cap, attachable to a second side of the drive plate, around the shaft, and a pair of coil springs, coaxially positioned around the shaft and against the first and second caps, respectively, on opposing sides of the driving member.

In accordance with a more detailed embodiment, the damping mechanism is attached to a slidable impact roller assembly of a cable impact reduction box.

In accordance with yet another embodiment thereof, the present disclosure provides a split collar of two pieces. Each collar piece includes a semi-cylindrical inner surface, having a central axis, configured for abutment against one side of a cylindrical shaft. Each collar piece also includes an outer surface, having a downwardly angled semi-cylindrically tapered outer surface and an upwardly angled semi-cylindrically tapered outer surface. Each collar piece also includes a substantially planar mating surface, extending between the inner and outer surfaces and defined by a plane extending through the central axis.

In accordance with a more detailed embodiment, the split collar includes first and second end surfaces, disposed at distal ends of the downwardly and upwardly angled tapers, respectively, each end surface being configured for abutting contact with a step of a reduced diameter region of the cylindrical shaft.

In accordance with another more detailed embodiment, the downwardly and upwardly angled tapers have angles of about 3° with respect to the central axis. In accordance with another more detailed embodiment, the downwardly angled taper has a maximum diameter that is larger than a maximum diameter of the upwardly angled taper.

These and other embodiments of the present application will be discussed more fully in the description. The features, functions, and advantages can be achieved independently in various embodiments of the claimed invention, or may be combined in yet other embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope as defined by the appended claims.

DESCRIPTION OF ILLUSTRATIVE EMBODIMENTS

Illustrative embodiments are described below as they might be employed in a double-tapered mount for an oscillating shaft. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments will become apparent from consideration of the following description and drawings. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

Figure 1:
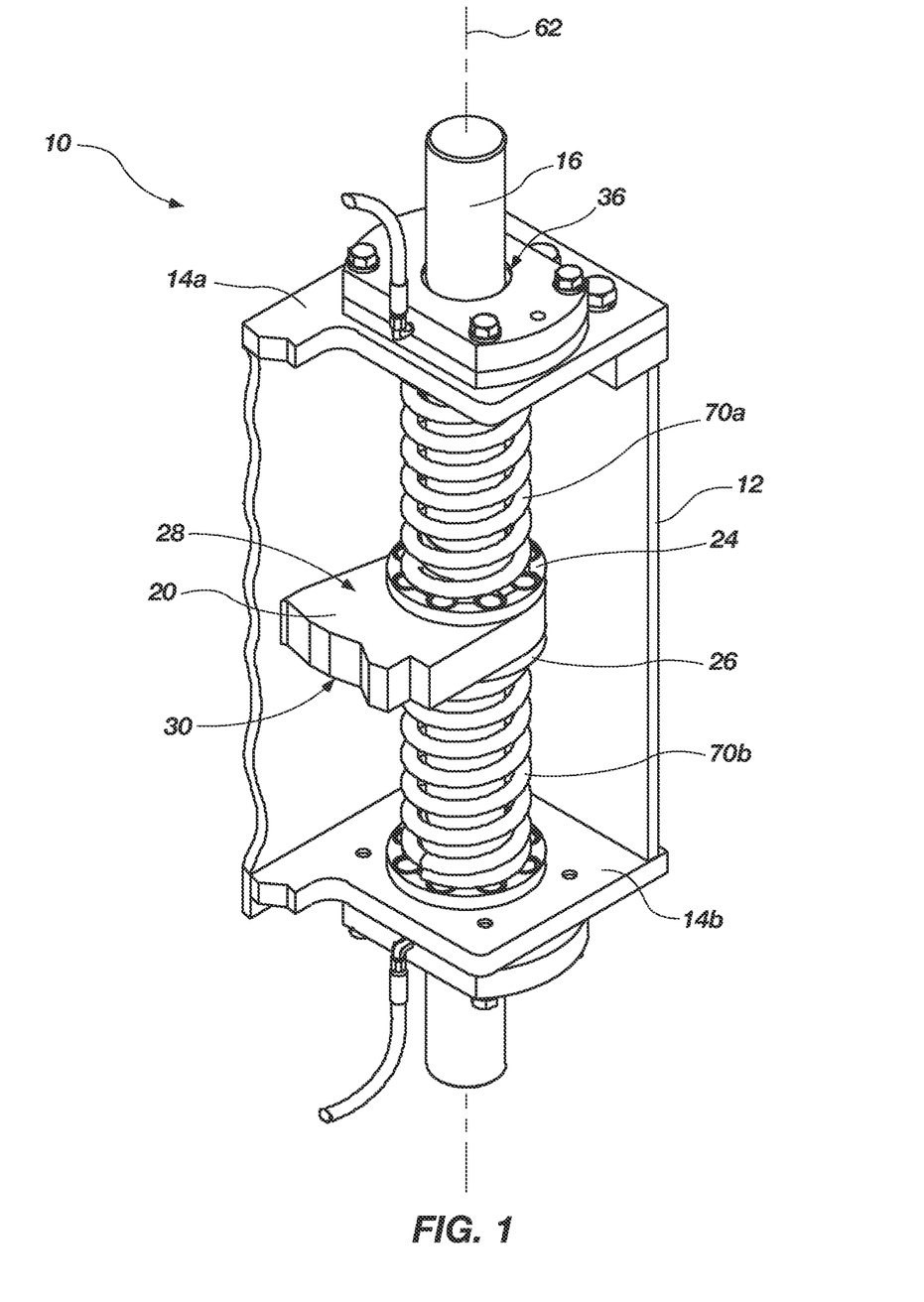
FIG. 1 is a perspective view of an embodiment of a spring box assembly for an energy damping mechanism.
Figure 2:
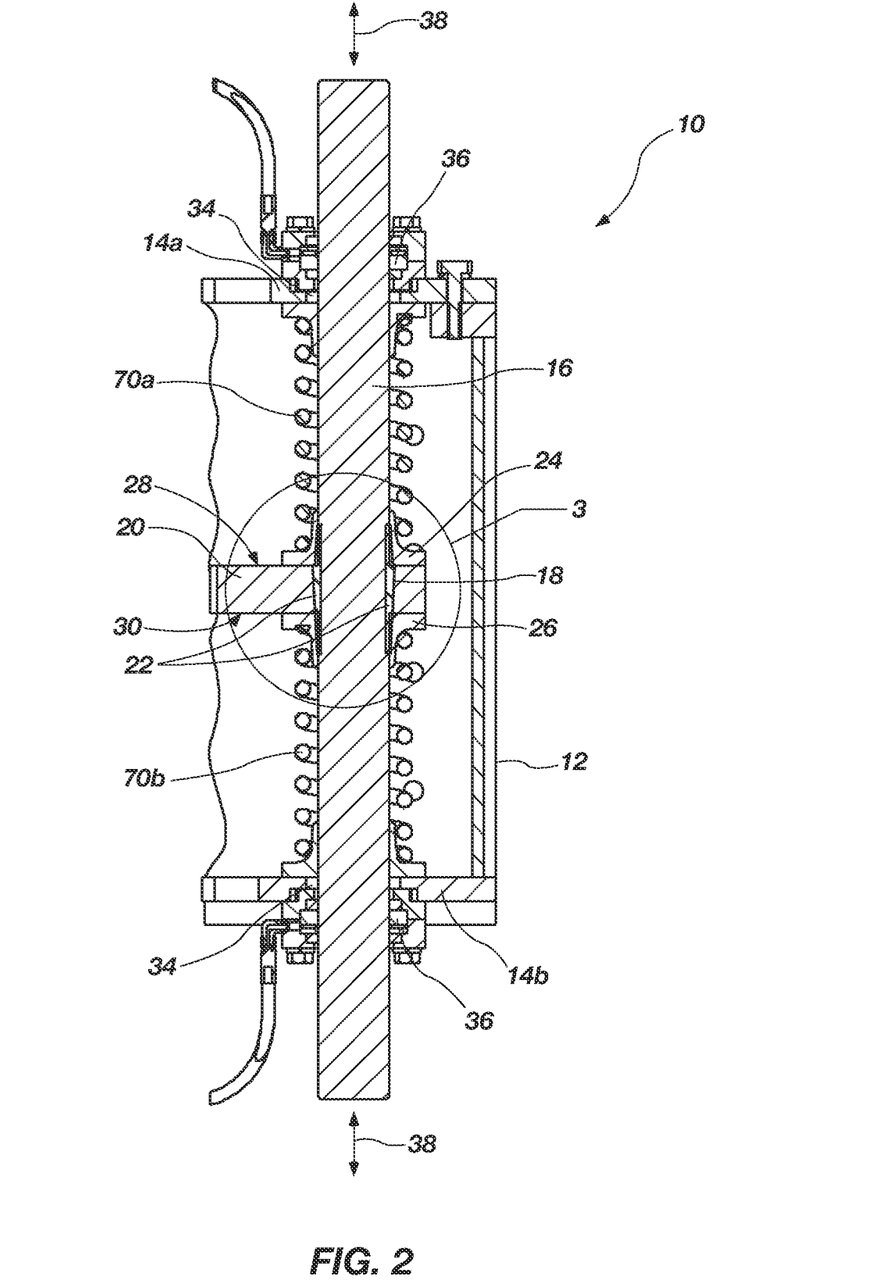
FIG. 2 is a front, cross-sectional view of the spring box assembly of FIG. 1.
Figure 3:
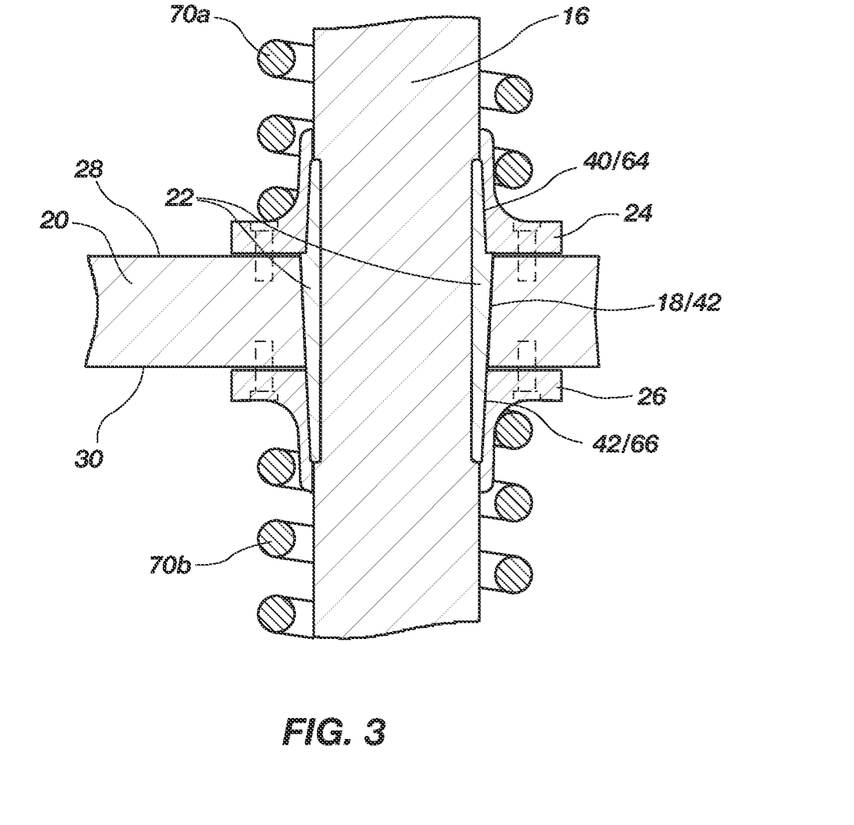
FIG. 3 is a close-up view of a portion of the cross-sectional view of FIG. 2.

FIG. 1 is a perspective view of an embodiment of a spring box assembly 10 for an energy damping mechanism. FIG. 2 provides a front, cross-sectional view of the spring box assembly of FIG. 1, and FIG. 3 is a close-up view of a portion of FIG. 2. The components of a shaft mount for the spring box assembly 10 are also shown in the exploded perspective view of FIG. 4. The spring box assembly 10 as a whole can be referred to as an oscillating shaft mechanism, and also an energy damping mechanism. In the embodiment shown in FIGS. 1-3, the spring box assembly 10 includes a frame 12, having opposing end plates 14a, 14b that are substantially parallel to each other, and substantially perpendicular to long axis 62 of a shaft 16. The shaft 16 is mounted through a tapered aperture 18 in a drive plate 20 using a split collar 22 having a double-tapered configuration. Top and bottom caps 24, 26 with similar tapers are attached to opposing sides of the drive plate 20, via bolts 32 or the like, and serve to hold the collar 22 and the shaft 16 in place with a high degree of perpendicularity to the drive plate 20.

The end plates 14 of the frame 12 each include an aperture 34 with a bushing 36 in each aperture. The apertures 34 and the bushings 36 are axially aligned with the shaft 16, and the shaft 16 is configured for sliding oscillation along its long axis 62 within the bushings 36, in the direction of arrow 38. The shaft 16 has a main outer diameter D, and can have a central region 39 of reduced diameter d. In one embodiment, the shaft 16 has a main outer diameter D of about 3" and the central region 39 has a smaller diameter d of about 2.75". The shaft 16 may comprise chrome plated high strength steel, such as grade C1045/1050.

In the illustrated embodiment, the shaft 16 is mounted to the drive member or drive plate 20 approximately in the center of the spring box assembly 10. The drive plate 20 has a a first or top side 28 and a second or bottom side 30, and provides oscillating motion to the shaft 16. In the embodiments shown herein, the drive plate 20 is part of a cable impact reduction box, shown nd described below in more detail with respect to FIG. 6. The drive plate 20 includes a tapered aperture 18 through which the shaft 16 extends. The mount for the shaft 16 upon the drive plate 20 includes the split collar 22, mentioned above. The split collar 22 is disposable around the shaft 16, and includes an upper tapered outer surface 40a, 40b, and a lower tapered outer surface 42a42b. These tapered surfaces taper away from each other. The tapered aperture 18 of the drive plate 20 is configured to substantially mate with the lower tapered outer surface 42a, 42b of the collar 22. In one embodiment, the tapered outer surfaces 40a, 40b, 42a, 42b of the split collar 22 and the drive plate aperture 18 can have a taper angle of about 3°. Other taper angles can also be used. In one embodiment, the drive plate 20 is made of ASTM grade A514 steel, having a 100ksi yield strength, and is about 2" thick.

Figure 4:
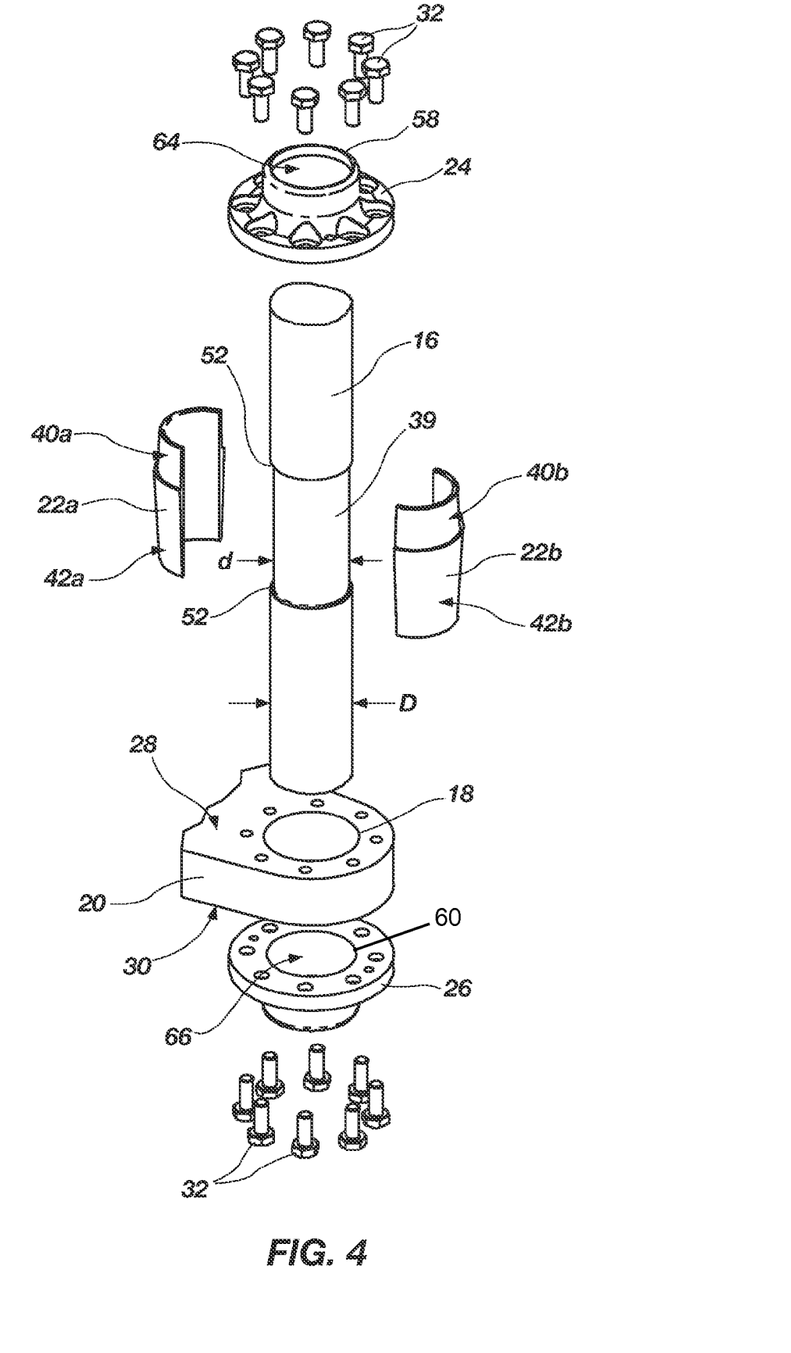
FIG. 4 is an exploded perspective view of an embodiment of an oscillating shaft assembly of the spring box of FIGS. 1-3.
Figure 5:
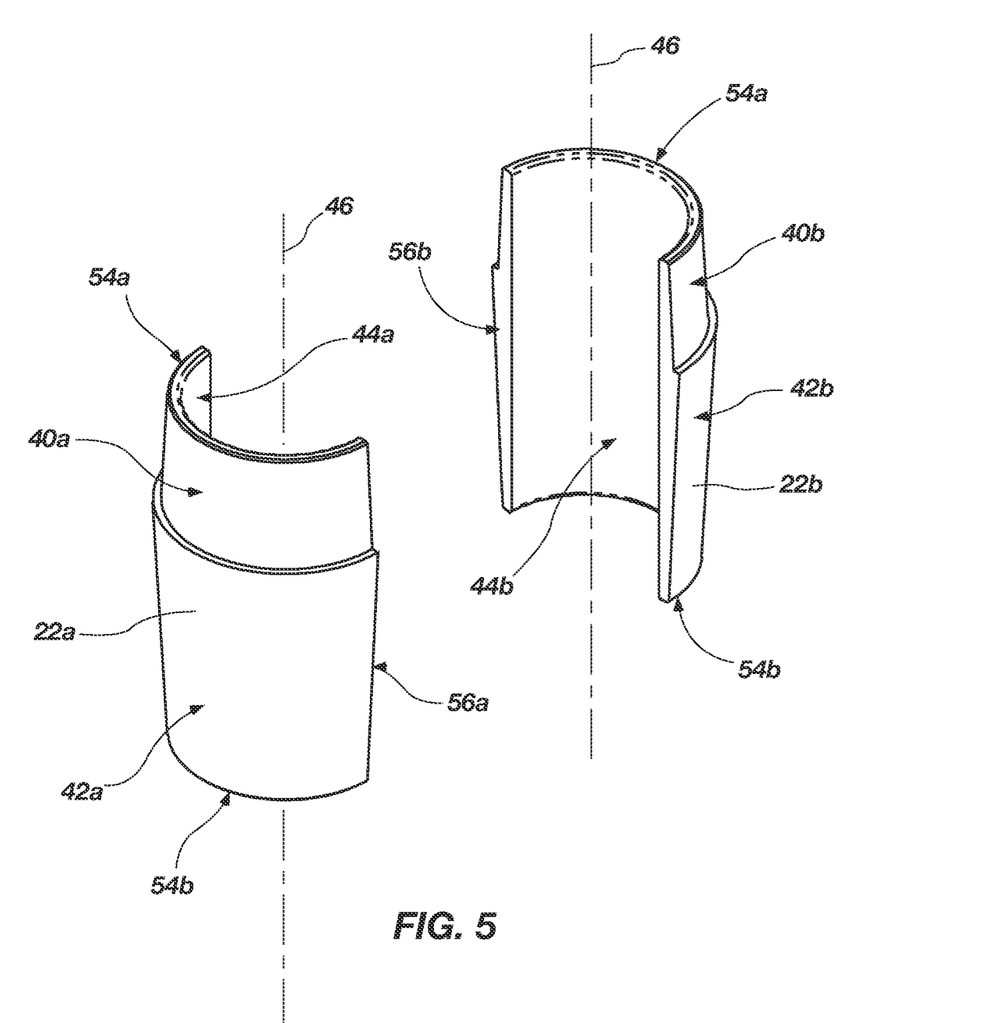
FIG. 5 is a perspective view of an embodiment of a split collar for the oscillating shaft assembly of FIG. 4.

FIG. 5 provides a perspective view of an embodiment of a split collar 22 for the oscillating shaft assembly of FIG. 4. The split collar 22 includes two pieces 22a, 22b, which can be mirror images of each other, though in some embodiments the two collar pieces 22a, 22b can include slight differences. Each collar piece 22a, 22bhas a semi-cylindrical inner surface 44a, 44b that curves about a central axis 46. These semi-cylindrical inner surfaces 44a, 44b are configured for abutment against one side of the central region 39 of the shaft 16. In one embodiment, where the shaft 16 has a central region with a diameter d of about 2.75", the diameter of the inner surfaces 44a, 44b of the split collar 22 can likewise be about 2.75".

The outer surface of the split collar pieces 22a, 22b have a double-tapered configuration, with tapered surfaces 40a, 40b, 42a, 42b that taper away from each other. As noted above, the collar pieces 22a, 22b each have an upwardly angled semi-cylindrically tapered outer surface 40a, 40b and a downwardly angled semi-cylindrically tapered outer surface 42a, 42b. The downwardly angled taper 42a, 42b is configured to mate with the tapered aperture 18 in the drive plate 20, and to mate with the bottom cap 26. The upwardly angled taper 40a, 40b is configured to mate with the top cap 24. These downwardly and upwardly angled tapers 40a, 40b, 42a, 42b can have similar angles, or different angles. As mentioned above, in one embodiment, these tapered surfaces 40a, 40b, 42a, 42b can have a taper angle of about 3° with respect to the central axis 46, to match the taper of the aperture 18. Other taper angles can also be used for the split collar 22 and the tapered aperture 18. For example, while a taper angle of 3° has been used, it is believed that taper angles as low as 1° and greater than 5° can be used. Standard tapers, such as one of the variety of Morse tapers (which are generally in the range of 1.5° -2°) can also be used. In general, when the taper angle becomes very small, this can reduce the strength of the shaft mount. On the other hand, large taper angles can affect part thicknesses, and begin to become impractical. In the embodiment shown in FIGS. 4 and 5, the downwardly angled taper 42a, 42b has a maximum diameter that is larger than a maximum diameter of the upwardly angled taper 40a, 40b.

In the embodiment shown in FIGS. 1-3, the shaft 16 includes a step or shoulder 52 at opposing ends of the central region 39. As shown in FIGS. 4 and 5, the split collar 22 includes first and second end surfaces 54a, 54b disposed at distal ends of the tapers 40a, 40b, 42a, 42b. These end surfaces 54a, 54b are configured for abutting contact with the step or shoulder 52 at the ends of the central region 39 of the shaft 16. This configuration helps increase the strength of the connection between the shaft 16 and the split collar 22. As an alternative, however, in some applications the shaft 16 can have a constant diameter, with no region of reduced diameter, and the split collar 22 can be configured to hold the shaft 16 in place solely by friction, due to the wedge action of the tapered surfaces 40a, 40b, 42a, 42b. Those of skill in the art will recognize that the suitability of this sort of configuration can depend upon the forces that the shaft 16 will experience.

The split collar pieces 22a, 22b also include a substantially planar mating surfaces 56a, 56b extending between the respective inner surfaces 44a, 44b and outer surfaces 40a, 40b, 42a, 42b, and defined by a plane extending approximately through the central axis 46. These mating surfaces are configured to allow the collar pieces to be brought close together when placed around the central region 39 of the shaft 16. For a tight fit, it is desirable that each split collar piece define an angle of 180° or less, so that the collar pieces 22a, 22b do not prevent each other from pressing tightly against the shaft 16. That is, when the split collar pieces 22a, 22b are in place against the central region 39 of the shaft 16 and installed in the drive plate 20, there can still be a slight gap between the mating surfaces 56a, 56b of the split collar 22.

The shaft 16 also extends through a tapered aperture 58 of the top cap 24, which can be attached to the drive plate 20 via bolts 32 or the like, and has an inner tapered surface 64 configured to mate with the upper tapered outer surface 40a, 40b of the collar 22. The drive plate 20, being a first mating piece, and the top cap 24, being a second mating piece, are adapted to affix the shaft 16 securely to the drive plate 20 for motion in both directions along the axis 62 of the shaft. Furthermore, the drive plate 20 and top cap 24, and their respective tapered apertures 18, 58 are aligned such that when the collar 22 is mated with the drive plate 20 and the top cap 24, the shaft 16 is held securely within the tapered aperture 18 of the drive plate 20 and substantially perpendicular thereto during its oscillating motion. In one embodiment, the tapered inner surface 58 of the top cap 24 has an angle of about 3°, in order to match the taper angle of the upper outer surface 40a, 40b of the split collar 22. Other taper angles can also be used, as noted above. Specifically, taper angles of from 1° -5° are believed to be highly suitable, and larger angles can also be used.

The mount can also include a bottom cap 26, which is attachable to the bottom side 30 of the drive plate 20 via bolts 32 or other suitable fasteners. The bottom cap 26 can be substantially identical to the top cap 24, and provides a third mating piece with a third tapered aperture 60 having a tapered surface 66 that is configured to mate with the lower tapered outer surface 42a, 42b of the collar 22 on the bottom side of the drive plate 20. That is, the lower tapered outer surface 42a, 42b of the collar 22 can extend below the bottom surface 30 of the drive plate 20 when inserted in the aperture 18 of the drive plate 20, and the inner tapered surface 66 of the bottom cap 26 can bear against this lower portion of the outer tapered surface of the collar 22. In one embodiment, the drive plate 20 is about 2" thick and its aperture 18 has a taper of about 3°, with a minimum diameter of 3⁄1;4" at the bottom surface 30 of the drive plate 20. As noted above, the lower tapered surface 42a, 42b of the split collar can have a taper (of the same angle) that is about 3.81" long, and has a maximum diameter of about 3.49". This design causes a portion of the lower tapered surface 42a, 42b of the collar to extend below the bottom 30 of the drive plate 20 by a distance that is comparable to the height of the upper tapered surface 40a, 40b above the top surface 28 of the drive plate 20. The tapered inner surface 66 of the bottom cap 26 can have an angle of about 3° (to match the taper angle of the lower outer taper 42a, 42b of the split collar 22), and bears against the portion of the lower collar taper 42a, 42b that extends below the bottom surface 30 of the drive plate 20, in a manner similar to the bearing of the top cap 24 against the upper taper 40a, 40b of the collar 22.

While the shaft mounting system disclosed herein is shown with both a top cap 24 and bottom cap 26, the system can also be configured with only a top cap 24. Specifically, since the lower taper 42a, 42b of the split collar 22 bears against the tapered aperture in 18 the drive plate 20, and the upper taper 40a, 40b of the collar 22 bears against the inner taper of the top cap 24, the connection of the top cap 24 to the drive plate 20, thus provides two tapered bearing surfaces (of the top cap 24 and drive plate aperture 18) that press in opposite directions against the oppositely tapered surfaces 40a, 40b, 42a, 42b of the collar 22, thus holding the shaft 16 securely in place. Thus, the double-tapered mount for a shaft disclosed herein can be described as including a collar, having first and second tapered outer surfaces that taper away from each other, the collar being disposable around the shaft. The first tapered surface of the collar mates with a tapered aperture of a first mating piece (e.g., the drive plate) and the second tapered surface of the collar mates with a tapered surface of a second mating piece (e.g., the top cap). The bottom cap 26 provides additional strength to the connection, but the shaft mount disclosed herein can be used without the bottom cap 26, if desired.

As another alternative embodiment, the aperture 18 in the drive plate 20 can be a cylindrical aperture, having no taper. In such an embodiment, the collar 22 does not include a tapered surface configured to bear against the drive plate aperture 18, but instead includes oppositely tapered surfaces 40a, 40b, 42a, 42b that are configured to bear against the top and bottom caps 24, 26. In this embodiment, the top and bottom caps 24, 26 hold the shaft 16 securely to the drive plate 20 through their attachment to the drive plate 20.

A pair of springs 70a, 70b are provided to press against the drive plate 20, and provide damping of oscillation of the shaft assembly. These springs 70a, 70b can be coil springs in compression, disposed around the shaft 16 on opposing sides of the drive plate or driving member 20, in abutting contact with the top and bottom caps 24, 26, respectively, and abutting an interior of the opposing ends 14 of the frame 12. Linear oscillating motion of the shaft 16 will be opposed by the springs 70a, 70b which will tend to urge the drive plate 20 back to a central, balanced position. While compression springs are shown and described, tension springs can also be used. It will also be apparent that spring types other than coil springs can be used, and a variety of connection methods other than those shown can be employed to operatively connect the springs to the drive plate and shaft assembly.

Figure 6:
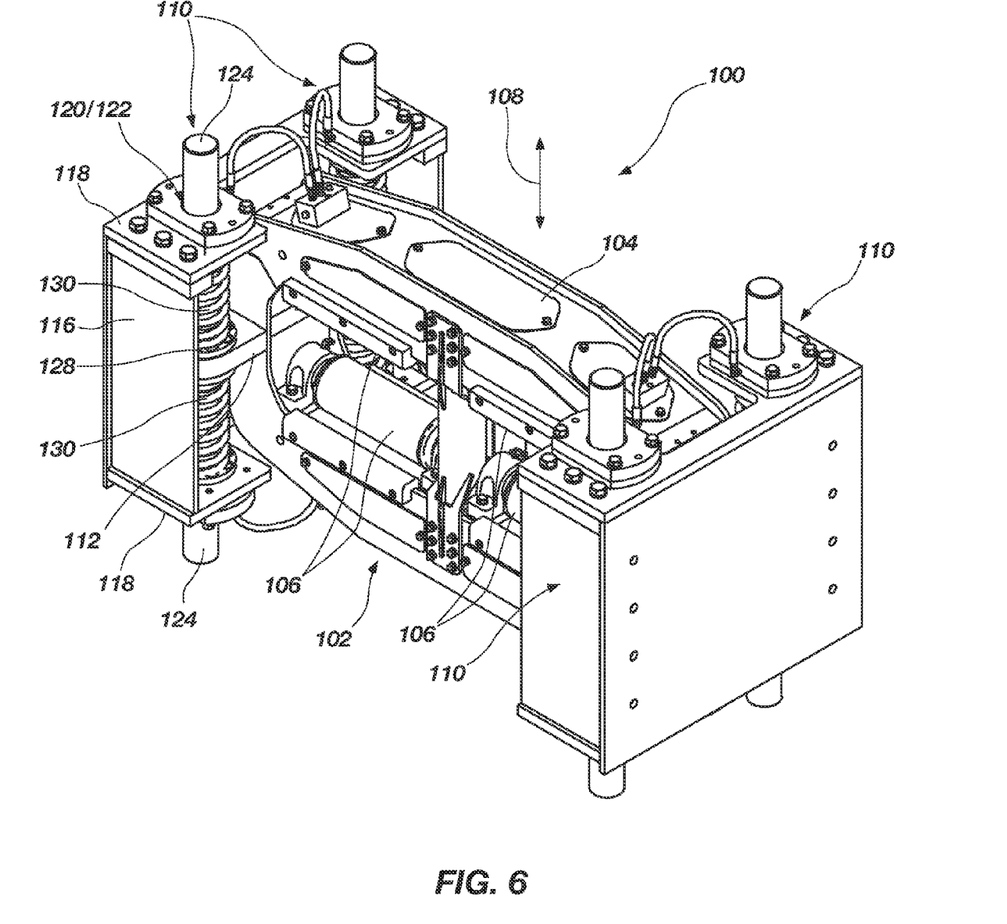
FIG. 6 is a perspective view of an embodiment of a cable impact reduction box which incorporates a spring box assembly in accordance with the present disclosure.

As noted above, the spring box assembly 10 with the oscillating shaft mechanism provides an energy damping mechanism. This energy damping mechanism can be part of a cable impact reduction box 100, one embodiment of which is shown in FIG. 6. Cable operated machinery, such as construction cranes, large earth moving machinery, etc., frequently suffer from cable impact. As large forces are applied to and released from high tension cables, the cables often slap back and forth with significant force. This cable impact can damage the cables and shorten their useful life, and can also damage the machinery.

A cable impact reduction box 100 like that shown in FIG. 6 can include a slidable impact roller assembly 102 that is part of a movable central frame 104, with one or more pairs of rollers 106, between which cables (not shown) extend. The impact of cable slapping is borne by the rollers 106, which cause the impact roller assembly 102 to oscillate in response, in the direction of arrow 108. The impact roller assembly 102 is movably attached to spring boxes 110 at its corners, and the spring boxes 110 in turn can be fixedly attached to the machinery (not shown). This device dampens and controls excess stresses on the cables, and has been found to be highly effective in reducing shock and bounce in the cables during operation. Reducing bounce reduces shock to the machine, which helps preserve the machine's integrity, and reduces downtime, while increasing safety. After field testing, this cable impact reduction box 100 has been proven effective in dampening hoist-cable vibration, bounce and impact, making machines safer to operate, and reducing the amount of maintenance needed and conserving cable life. One other beneficial function of the cable impact reduction box 100 is that it helps reduce the frequency of cable changes, and reduces the potential for accidents during cable changes.

In one embodiment, the cable impact reduction box 100 can be mounted on the front of a large earth-moving shovel, within easy view of the shovel operator. Sensors, lights and the like (not shown) can be provided to give feedback to the operator, so that the operator can learn to stop cable bounce early, before it becomes excessive, reducing cable wear and making the shovel more efficient.

In a cable impact reduction box 100, multiple spring box assemblies 110 like that disclosed herein can be used to absorb energy from cables. In the embodiment of FIG. 6, two spring box assemblies 110 are positioned at each end of the central frame 104. In this configuration, a single drive plate 112 will be shared by each pair of spring box assemblies 110. In this embodiment, the shared drive plate 112 will include a pair of tapered apertures (not visible in FIG. 6) at opposing ends. Spring box frame 116 has opposing ends 118 with two pairs of axially aligned apertures 120, and a bushing 122 in each aperture for supporting the sliding shaft 124, as discussed above. The shaft 124 is mounted in each of the tapered apertures of the drive plate 112 with a split collar (not visible in FIG. 6) having oppositely tapering surfaces disposed around the central region of the shaft, as discussed above. Top and bottom caps 128 are attached to the drive plate 112 in the manner discussed above, and springs 130 for damping of oscillation are positioned against the top and bottom caps 128 and the ends 118 of the spring box frame 116. This configuration securely holds the shaft 124 within the tapered aperture of the drive plate 112 and substantially perpendicular to the drive plate during oscillating motion of the shaft.

While the above description has been presented in the context of a cable impact reduction box, it is to be understood that the double-tapered mount for an oscillating shaft described herein can be applied in any situation where a shaft is to be attached perpendicularly to another member, particularly in high energy or high stress applications. For example, this type of shaft mounting system can be used for mounting large, heavy axles, rolling elements, conveyors, hydraulic presses, etc.

Additionally, while the embodiment shown herein is designed for linear oscillation, other configurations can also be used. For example, an embodiment of the double-tapered mount disclosed herein can be used with a curved shaft that is to be mounted upon a pivoting member. Those of skill in the art will recognize that an end of a moment arm or other pivoting member that oscillates will define an arcuate path. A curved shaft that substantially matches the radius of the pivoting member can be attached to the pivoting member, with motion damping springs or comparable devices attached to the pivoting member. Other configurations can also be used.

This shaft mounting configuration thus allows rapid and secure attachment of a shaft to another mechanical member in many types of machines. The double-tapered configuration resists forces in both directions, and provides a self-seating or self-tightening function, since forces upon the shaft in each direction will naturally tend to press the shaft and the split collar more securely into the respective tapers. In this way, the shaft connection becomes stronger with use, rather than tending to loosen over time due to vibration.

Moreover, this double-taper attachment configuration makes it easier to attach the shaft to a drive member with a high degree of perpendicularity, which is primarily limited by the tolerance of the machining tool, and using the method disclosed herein can be in the range of about 0.0001" to 0.0002". If the shaft were welded to the drive plate, on the other hand, it would be difficult to do so and also ensure that the shaft is accurately perpendicular to the drive plate. In a typical case, accuracy of 0.0125" is possible for a welded connection with a well-designed jig. As these numbers indicate, the attachment configuration disclosed herein is believed to provide an approximately 62- to 125-fold tighter tolerance than a welded connection, resulting in improved perpendicularity.

Disassembly for repair or maintenance is also more difficult with a welded connection, as compared to the attachment configuration disclosed herein, which offers several advantages. First, the configuration shown herein readily lends itself to field disassembly and high tolerance field reassembly, which could not be achieved with field welding. Additionally, field maintenance of the double-taper configuration can be achieved with common hand tools. Furthermore, all parts are interchangeable, shaft-to-shaft.

Welding of high strength steel parts also presents additional complexities associated with heat affected zones. Welding can cause distortion and material weakening, which can be mitigated by heat treatment procedures, but these also adversely affect tolerances (and therefore perpendicularity). In the shaft mount configuration shown herein, the elimination of potential heat affected zones that would be caused by welding allows the use of harder material, which has much higher wear tolerance and reduces the need to for high surface finishes (e.g., chrome finish), resulting in a more robust solution that is also more efficiently manufactured.

Additionally, compared to a welded connection, this attachment methodology disclosed herein lends itself to a highly repeatable manufacturing process, which is believed to result in (1) higher tolerances, (2) near zero variance article to article, and (3) high throughput manufacturing processes that are largely unmanned.

Similarly, a threaded connection presents several potential difficulties. First, a threaded connection of the shaft to the drive plate would present a greater possibility of the shaft loosening over time due to vibration. Second, stress concentrations, potentially resulting in thread fracture, can also reduce the strength of the connection while making disassembly difficult. Third, it can be difficult to obtain a high degree of perpendicularity of the shaft to the drive plate with a threaded connection because a certain degree of clearance is required between the male and female threads to allow proper assembly and disassembly.

The attachment configuration described herein also reduces the amount and type of machining that is required to be done upon the shaft. Machining threads or other complex features on a high strength steel shaft is difficult and time-consuming. For example, machined threads involve a two step process: sizing and cutting the threads. The two step process in not only less efficient, but also potentially introduces cumulative tolerance error. On the other hand, forming a reduced diameter stepped region in the shaft involves only minimal machining, and is a relatively simple, single step, single tool operation that can be done with high accuracy.

Although various embodiments have been shown and described, the invention is not so limited and will be understood to include all such modifications and variations as would be apparent to one skilled in the art. For example, equivalent elements may be substituted for those specifically shown and described, certain features may be used independently of other features, and the number and configuration of various vehicle components described above may be altered, all without departing from the spirit or scope of the invention as defined in the appended claims.

Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A mount for a shaft, comprising:
    a collar, disposable around the shaft, having first and second tapered outer surfaces that taper away from each other;
    a first mating piece, having a first tapered aperture configured to mate with the first tapered outer surface of the collar; and
    a second mating piece, having a second tapered aperture configured to mate with the second tapered outer surface of the collar, wherein the first and second mating pieces are adapted to be aligned such that when the collar is mated with the first and second mating pieces, the shaft is substantially perpendicular to the first mating piece; and
    a third mating piece, having a third tapered aperture, configured to mate with the first tapered outer surface of the collar on a side of the first mating piece opposite the second mating piece.

2. The mount of claim 1, wherein the first tapered outer surface of the collar has a maximum diameter that is larger than a maximum diameter of the second tapered outer surface of the collar.

3. A mount for a shaft, comprising:
    a collar, disposable around the shaft, having first and second tapered outer surfaces that taper away from each other;
    a drive member having first and second sides and a first tapered aperture configured to mate with the first tapered outer surface of the collar;
    a first cap attachable toward the first side of the drive member, the first cap having a second tapered aperture configured to mate with the second tapered outer surface of the collar, wherein the drive member and the first cap are adapted to be aligned such that when the collar is mated with the drive member and the first cap, the shaft is substantially perpendicular to the drive member; and
    a second cap, having a third tapered aperture, attachable toward the second side of the drive member and configured to mate with the first tapered outer surface of the collar.

4. The mount of claim 3, further comprising a pair of coil springs, coaxially disposable around the shaft, an end of each one of the pair of springs being in abutting contact with the first and second caps, respectively.

5. The mount of claim 3, wherein the first tapered outer surface of the collar has a maximum diameter that is larger than a maximum diameter of the second tapered outer surface of the collar.

* * * * *

UNITED STATES PATENT AND TRADEMARK OFFICE
CERTIFICATE OF CORRECTION

PATENT NO. : 8,904,892 B2  
APPLICATION NO. : 12/959157  
DATED : December 9, 2014  
INVENTOR(S) : Douglas A. Sayer Page 1 of 1

It is certified that error appears in the above-identified patent and that said Letters Patent is hereby corrected as shown below:

In the specification:

| | | |
|---|---|---|
| COLUMN 6, | LINE 30, | change "3° ," to --3°,-- |
| COLUMN 6, | LINE 33, | change "40*b*" to --42*b*-- |
| COLUMN 6, | LINE 38, | change "40*b*above" to --40*b* above-- |

Signed and Sealed this

Thirteenth Day of October, 2015

Michelle K. Lee
*Director of the United States Patent and Trademark Office*